(12) United States Patent
Shavell et al.

(10) Patent No.: US 10,399,814 B2
(45) Date of Patent: Sep. 3, 2019

(54) RUNNING-END SPOOL CONTAINMENT DEVICE AND SYSTEM

(71) Applicant: Academus Solutions, LLC, Ijamsville, MD (US)

(72) Inventors: David L. Shavell, Ijamsville, MD (US); Elvin M. Peprah, Pittsburgh, PA (US); David W. Tarr, Silver Spring, MD (US); Parker A. Jones, Ijamsville, MD (US)

(73) Assignee: Academus Solutions, LLC, Ijamsville, MD (US)

( * ) Notice: Subject to any disclaimer, the term of this patent is extended or adjusted under 35 U.S.C. 154(b) by 121 days.

(21) Appl. No.: 15/366,630

(22) Filed: Dec. 1, 2016

(65) Prior Publication Data

US 2017/0158457 A1  Jun. 8, 2017

Related U.S. Application Data

(60) Provisional application No. 62/375,242, filed on Aug. 15, 2016, provisional application No. 62/262,584, filed on Dec. 3, 2015.

(51) Int. Cl.
*B65H 75/44* (2006.01)
*B65H 75/48* (2006.01)
(Continued)

(52) U.S. Cl.
CPC ......... *B65H 75/4431* (2013.01); *B65H 75/40* (2013.01); *B65H 75/4402* (2013.01);
(Continued)

(58) Field of Classification Search
CPC .... B65H 75/00; B65H 75/34; B65H 75/4402; B65H 75/4442; B65H 75/4431;
(Continued)

(56) References Cited

U.S. PATENT DOCUMENTS 3,312,451 A  4/1967  Davis
3,402,901 A  9/1968  van Houten
(Continued)

FOREIGN PATENT DOCUMENTS

WO  2017/096213 A1  6/2017

OTHER PUBLICATIONS

International Search Report and Written Opinion received for PCT Patent Application. PCT/US2016/064704, dated Feb. 16, 2017, 13 pages.

*Primary Examiner* — Michael R Mansen
*Assistant Examiner* — Raveen J Dias
(74) *Attorney, Agent, or Firm* — Fiala & Weaver P.L.L.C.

(57) ABSTRACT

Running-end spool containment devices and systems are described herein that allow a user to secure a running-end of a strap within a lockable device to anchor the running-end of the strap at a selectable length when the device is in a locked mode, and to enable the running-end of the strap be lengthened or shortened when the device is in an unlocked mode. In an embodiment, the device includes an axel about which the running-end of a strap can be wound and unwound, a lock case that can engage the axel to prevent axel rotation in the locked mode and that can be disengaged from the axel to allow the axel to rotate freely in the unlocked mode, and a spring case that causes the axel to rotate and the running-end of the strap to wind around the axel when the lock cases is in the unlocked mode.

14 Claims, 10 Drawing Sheets

(51) Int. Cl.
  *B65H 75/40* (2006.01)
  *A63B 21/00* (2006.01)
  *B60R 22/00* (2006.01)

(52) U.S. Cl.
  CPC ....... *B65H 75/446* (2013.01); *B65H 75/4428* (2013.01); *B65H 75/486* (2013.01); *A63B 21/153* (2013.01); *B60R 22/00* (2013.01); *B65H 75/4436* (2013.01); *B65H 75/4442* (2013.01); *B65H 2701/375* (2013.01)

(58) Field of Classification Search
  CPC ............ B65H 75/4418; B65H 75/4423; B65H 75/75; B65H 75/4448; B65H 75/486; B65H 75/48; B65H 75/4447; B65H 75/446; B65H 16/10; B65H 20/30; B65H 23/06; B65H 49/205; B65H 49/54; B65H 49/585; B65H 75/025; B65H 75/248; B65H 75/30; B65H 75/406; B65H 75/4476; B65H 75/4473; B65H 75/483; A63B 21/153; A63B 21/157; A63B 21/4035; A63B 21/08; A63B 27/00; B60R 2022/029; B60R 22/1953; B60R 22/1958; B60R 22/202; B60R 22/203; B60R 22/30; B60R 22/3416; B60R 22/3421; B60R 22/347; B60R 22/415; B60R 2022/4493; G01B 2003/101; G01B 2003/1033; G01B 2003/102; G01B 2003/1038; B60P 7/083
  USPC ............ 242/384, 384.1, 384.2, 384.3, 384.4, 242/384.5, 384.6, 384.7, 396, 396.4, 242/396.2, 396.6, 396.7
  See application file for complete search history.

(56) References Cited

U.S. PATENT DOCUMENTS

| | | | |
|---|---|---|---|
| 3,944,163 | A | 3/1976 | Hayashi et al. |
| 4,202,510 | A * | 5/1980 | Stanish ................ A01K 27/004 242/384.7 |
| 4,957,248 | A | 9/1990 | Schmidt |
| 5,390,873 | A | 2/1995 | Fujimura et al. |
| 9,296,330 | B2 * | 3/2016 | Diamond ................ B60P 7/083 |
| 9,796,322 | B1 * | 10/2017 | Miller .................... B60P 7/083 |
| 2005/0121276 | A1 * | 6/2005 | Chi ......................... D06F 75/28 191/12.2 R |
| 2006/0249617 | A1 | 11/2006 | Cardona |
| 2007/0069060 | A1 * | 3/2007 | Maciejczyk .......... B60R 22/347 242/381.1 |
| 2008/0128541 | A1 * | 6/2008 | Huang .................... B60P 7/083 242/371 |
| 2012/0205478 | A1 | 8/2012 | Balquist et al. |
| 2014/0116354 | A1 | 5/2014 | Harris, II |

* cited by examiner

RUNNING-END SPOOL CONTAINMENT DEVICE AND SYSTEM

CROSS-REFERENCE TO RELATED APPLICATIONS

This application claims the benefit of U.S. Provisional Patent Application No. 62/262,584, filed on Dec. 3, 2015 and U.S. Provisional Patent Application No. 62/375,242, filed on Aug. 15, 2016, each of which is entitled "Running-End Spool Containment Device" and each of which is incorporated by reference herein.

BACKGROUND OF THE INVENTION

Field of the Invention

The present invention relates to strap containment. More particularly, the present invention relates to a running-end spool containment device and system used to contain the running-end of a strap.

Background Art

Some conventional resistance training systems rely on a user's bodyweight to supply the main force of resistance via the user suspending from a strap, cable or cord. Conventional suspension training systems that allow a user to perform exercises using a strap, cable or cord do not allow for the length of the strap, cable or cord to be adjusted. For example, when a strap in these systems is anchored, the strap is then fixed in position and the length(s) of the free end(s) (hereinafter, "running-ends") of the strap cannot be changed. Moreover, these running ends are free to become entangled with one another and or the user. A similar situation may occur with the running-ends of tie-down straps, such as straps used to constrain cargo for transportation or storage, for example. These free running-ends of various types of straps for various uses can create an annoying and sometimes dangerous situation if they become entangled with themselves, a user, or any other object.

BRIEF SUMMARY OF THE INVENTION

Running-end spool containment devices and systems are described herein that allow a user to secure a running-end of a strap within a lockable device to anchor the running-end of the strap at a selectable length when the device is in a locked mode, and to enable the running-end of the strap be lengthened or shortened when the device is in an unlocked mode. In an embodiment, the device includes an axel about which the running-end of a strap can be wound and unwound, a lock case that can engage the axel to prevent axel rotation in the locked mode and that can be disengaged from the axel to allow the axel to rotate freely in the unlocked mode, and a spring case that causes the axel to rotate and the running-end of the strap to wind around the axel when the lock cases is in the unlocked mode.

In another aspect, a running end spool containment system may comprise a device that includes a spool bracket having a spool bracket base, a first spool bracket arm that extends from a first side of the spool bracket base, and a second spool bracket arm that extends from a second side of the spool bracket base and is substantially parallel to the first spool bracket arm, the first spool bracket arm having a first spool bracket aperture defined therein, and the second spool bracket arm having a second spool bracket aperture defined therein. The device may further include a spring case attached to the first spool bracket arm, a lock case attached to the second spool bracket arm, and an axel having a first end that extends through the first spool bracket aperture into the spring case, a second end that extends through the second spool bracket aperture into the lock case, and a central portion that is disposed between the first and the second spool bracket arms. The device may further include a constant force spring disposed within the spring case, the constant force spring having a first end connected to the first end of the axel. A user-manipulable locking plate may be disposed within the lock case, the user-manipulable locking plate being manipulable by a user to selectively cause the axel to engage with or disengage from the user-manipulable locking plate, the user-manipulable locking plate being configured to prevent the axel from rotating when the axel is engaged with the user-manipulable locking plate, and the axel may be able to rotate freely when the axel is not engaged with the user-manipulable locking plate. The constant force spring may be configured to wind around the first end of the axel when the axel rotates in a first direction, the constant force spring placing the axel under tension when wound around the first end of the axel causing the axel to rotate in a second direction opposite the first direction when no other force is applied to the axel, the constant force spring being further configured to unwind from around the first end of the axel when the axel rotates in the second direction. The device may further include an accessory bracket removably mounted to the spool bracket base, the accessory bracket configured to allow a user to engage an accessory with the spool bracket base and to disengage the accessory from the spool bracket base. The device may be configured to accept a strap that has a first running end that extends between the first spool bracket arm and the second spool bracket arm, the first running end being connected to the central portion of the axel, the first running end winding around the axel when the axel rotates in the first direction and unwinding from around the axel when the axel rotates in the second direction.

In another aspect, a running end spool containment system may comprise a device including a spool bracket having a spool bracket base, a first spool bracket arm that extends from a first side of the spool bracket base, and a second spool bracket arm that extends from a second side of the spool bracket base and is substantially parallel to the first spool bracket arm, the first spool bracket arm having a first spool bracket aperture defined therein, and the second spool bracket arm having a second spool bracket aperture defined therein. The device may further include a spring case attached to the first spool bracket arm, a lock case attached to the second spool bracket arm, and an axel, the axel having a first end that extends through the first spool bracket aperture into the spring case, a second end that extends through the second spool bracket aperture into the lock case, and a central portion that is disposed between the first and second spool bracket arms. A constant force spring may be disposed within the spring case, the constant force spring having a first end connected to the first end of the axel. The device may further include a user-manipulable locking plate disposed within the lock case, the user-manipulable locking plate being manipulable by a user to selectively cause the axel to engage with or disengage from the user manipulable locking plate, the user manipulable locking plate being configured to prevent the axel from rotating when the axel is engaged with the user-manipulable locking plate, the axel able to rotate freely when the axel is not engaged with the user-manipulable locking plate. The constant force spring may be configured to wind around the first end of the axel when the axel rotates in a first direction, the constant force spring placing the axel under tension when wound around the first end of the axel causing the axel to rotate in a second direction opposite the first direction when no other force is applied to the axel, the constant force spring being further configured to unwind from around the first end of the axel when the axel rotates in the second direction. The device may further include an accessory bracket removably mounted to the spool bracket base, the accessory bracket configured to allow a user to engage an accessory with the spool bracket base and to disengage the accessory from the spool bracket base. The device may further include a strap that has a first running end that extends between the first spool bracket arm and the second spool bracket arm, the first running end being connected to the central portion of the axel, the first running end winding around the axel when the axel rotates in the first direction and unwinding from around the axel when the axel rotates in the second direction.

In another aspect, a running end spool containment system may comprise a device including a spool bracket having a spool bracket base, a first spool bracket arm that extends from a first side of the spool bracket base, and a second spool bracket arm that extends from a second side of the spool bracket base and is substantially parallel to the first spool bracket arm, the first spool bracket arm having a first spool bracket aperture defined therein, and the second spool bracket arm having a second spool bracket aperture defined therein. The device may further include a spring case, the spring case being connected to the first spool bracket arm, a sliding lock case, the sliding lock case being movably connected to the second spool bracket arm, and an axel, the axel comprising a first end that extends through the first spool bracket aperture into the spring case, a second end that extends through the second spool bracket aperture into the sliding lock case, and a central portion that is disposed between the first and second spool bracket arms. The device may further include a constant force spring disposed within the spring case, the constant force spring having a first end connected to the first end of the axel, the sliding lock case being manipulable by a user to selectively cause the axel to engage with or disengage from the sliding lock case, the sliding lock case being configured to prevent the axel from rotating when the axel is engaged with the sliding lock case, the axel able to rotate freely when the axel is not engaged with the sliding lock case. The constant force spring being may be configured to wind around the first end of the axel when the axel rotates in a first direction, the constant force spring placing the axel under tension when wound around the first end of the axel causing the axel to rotate in a second direction opposite the first direction when no other force is applied to the axel, the constant force spring being further configured to unwind from around the first end of the axel when the axel rotates in the second direction. The device may further include an accessory bracket removably mounted to the spool bracket base, the accessory bracket configured to allow a user to engage an accessory with the spool bracket base and to disengage the accessory from the spool bracket base. The device may further include a strap having a first running end that extends between the first spool bracket arm and the second spool bracket arm, the first running end being connected to the central portion of the axel, the first running end winding around the axel when the axel rotates in the first direction and unwinding from around the axel when the axel rotates in the second direction.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
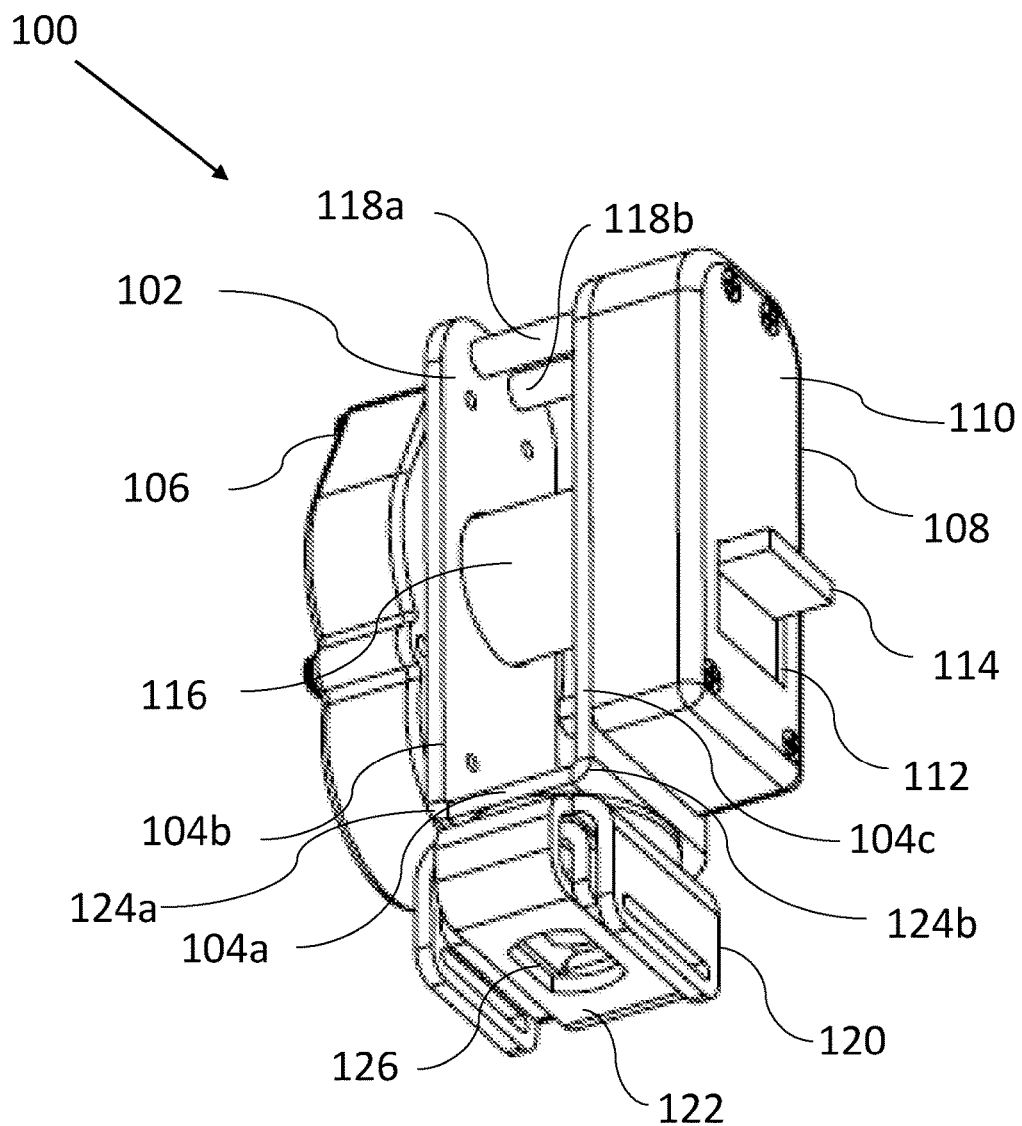
FIG. 1 shows a front isometric view of a running-end spool containment device in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

Example Embodiments

The example embodiments described herein are provided for illustrative purposes only, and are not limiting. The examples described herein may be adapted to any type of running-end spool containment system or running-end spool containment device. Further structural and operational embodiments, including modifications/alterations, will become apparent to persons skilled in the relevant art(s) from the teachings herein.

A running-end spool containment system according to various embodiments will now be described. First, components and configuration of a first example running-end spool containment device are described. Next, components and configuration of a first example running-end spool containment system are described. Next, operation of the running-end spool containment system is described including a description of the running-end spool containment device in a locked mode, in an unlocked mode, and while transitioning between a locked mode and an unlocked mode. Next, components and configuration of a second example running-end spool containment device are described. Thereafter, exemplary materials of components of the first example running-end spool containment system, first example running-end spool containment device, and second example running-end spool containment device are described. Next, a third example running-end spool containment system is incorporated by reference. Finally, closing remarks are made.

Figure 2:
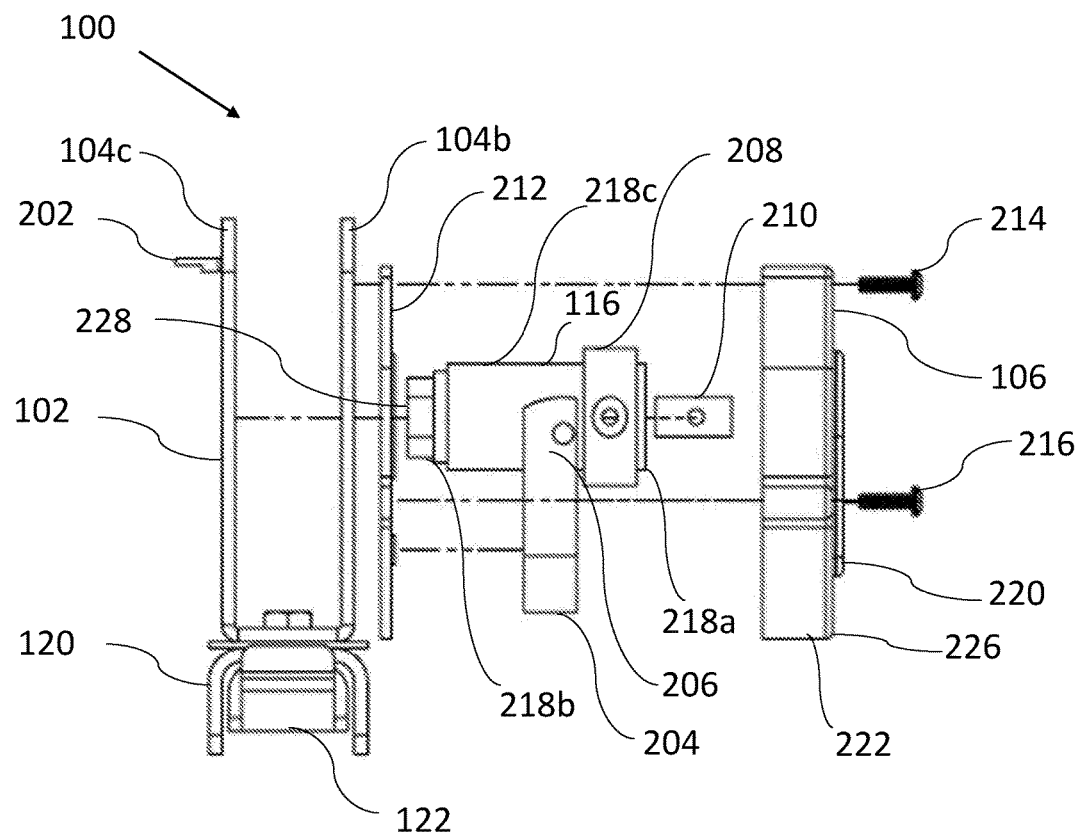
FIG. 2 shows an exploded front view of a portion of the running-end spool containment device of FIG. 1.
Figure 5:
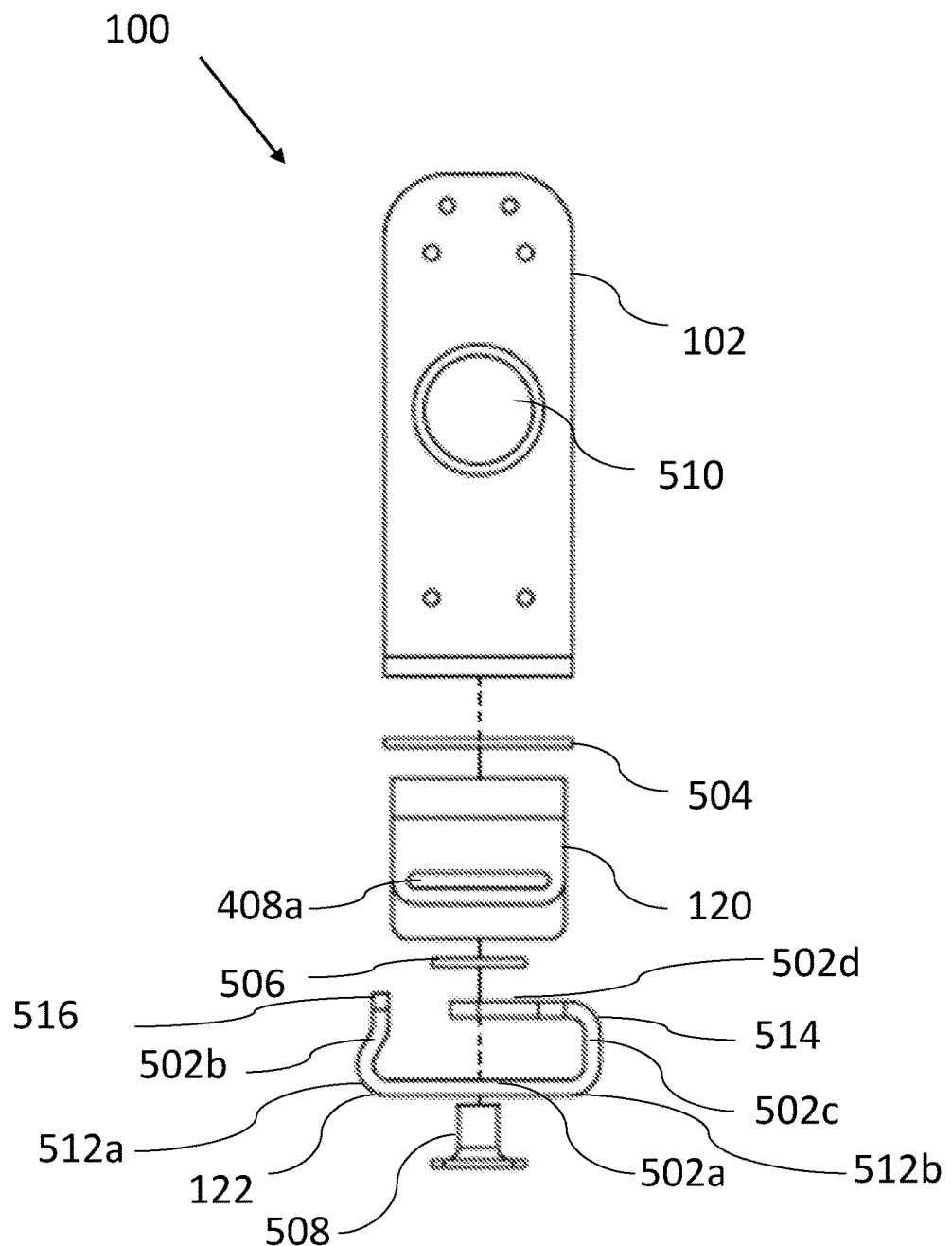
FIG. 5 shows an exploded side view of a portion of the running-end spool containment device of FIG. 1.

A. Components and Configuration of a First Example Running-End Spool Containment Device FIG. 1 shows a front isometric view of a first example running-end spool containment device 100. Running-end spool containment device 100 may comprise a part of a running-end spool containment system. As shown in FIG. 1, running-end spool containment device 100 includes a spool bracket 102, a spring case 106, a lock case 108, an axel 116, a first strap guide 118a, a second strap guide 118b, an accessory bracket 120, an accessory tab 122, and an accessory pin channel 126. Spool bracket 102 comprises a spool bracket base 104a, a first spool bracket arm 104b that extends from a first side 124a of spool bracket base 104a, and a second spool bracket arm 104c that extends from a second side 124b of spool bracket base 104a and is substantially parallel to first spool bracket arm 104b. First spool bracket arm 104b has a first spool bracket aperture 510 (as shown in FIG. 5) defined therein, and second spool bracket arm 104c has a second spool bracket aperture (not shown) defined therein. As shown in FIG. 2, axel 116 has a first end 218a that extends through first spool bracket aperture 510 into spring case 106, a second end 218b that extends through the second spool bracket aperture (not shown) into lock case 108, and a central portion 218c that is disposed between first spool bracket arm 104b and second spool bracket arm 104c.

Spring case 106 is connected to first spool bracket arm 104b. Lock case 108 is connected to second spool bracket arm 104c. Lock case 108 has a lock case aperture 112 defined therein. Lock case 108 further includes a lock tab arm 114 that extends through lock case aperture 112. Spring case 106 and lock case 108 will be described more fully below with respect to FIGS. 2-4.

As shown in FIG. 1, accessory tab 122 has an accessory tab aperture 126 defined therein. Accessory bracket 120 and accessory tab 122 will be described more fully below with respect to FIGS. 4, 5 and 6.

FIG. 2 shows an exploded front view of a portion of running-end spool containment device 100 of FIG. 1. FIG. 2 shows spool bracket 102, spring case 106, and axel 116 of running-end spool containment device 100. As shown in FIG. 2, running-end spool containment device 100 further includes a flange 202, a constant force spring 204, a spring collar 208, an axel pin 210 and an axel nut 228. As shown in FIG. 2, second spool bracket arm 104c includes flange 202. Flange 202 may be formed from a piece of first spool bracket arm 104b that is "punched out" of first spool bracket arm 104b. Alternately, flange 202 may be a separate component and may be screwed, glued, welded, or attached by any other means known now or in the future to second spool bracket arm 104c. Flange 202 will be described more fully with respect to FIG. 3.

As further shown in FIG. 2, spring case 106 has a front face 220 and a protruding lip 222 that surrounds an outer edge 226 of front face 220 and that protrudes toward lock case 108. Spring case 106 further includes a base plate 212. Spring case 106 may be contoured in a shape of constant force spring 204 disposed therein so that spring case 106 conforms to constant force spring 204. However, persons skilled in the relevant art(s) will understand that a shape of spring case 106 is arbitrary and that any shape may be used. Base plate 212 may be contoured in a same shape as spring case 106. Base plate 212 may be connected to spring case 106 by a first screw 216 and a second screw (not shown) positioned opposite first screw 216. Further, spring case 106 and base plate 212 may be connected to first spool bracket arm 104b by a third screw 214 and a fourth screw (not shown) opposite third screw 214. In the present embodiment, screws are used to connect spring case 106 to base plate 212 and spring case 106 and base plate 212 to first spool bracket arm 104b. However, persons skilled in the relevant art(s) will readily appreciate that any number of connecting mechanisms may be used to join spring case 106 to base plate 212 and spring case 106 and base plate 212 to first spool bracket arm 104b including but not limited to adhesive attachment, soldering, or a combination thereof.

Although not shown in FIG. 2, base plate 212 has defined therein a base plate aperture through which second end 218b and central portion 218c of axel 116 extend. Disposed between spring case 106 and base plate 212 are first end 218a of axel 116, constant force spring 204, spring collar 208, and axel pin 210. Constant force spring 204 may comprise a rolled ribbon of spring metal (e.g., steel) such that the spring is relaxed when it is fully rolled up and such that, as it is unrolled, a restoring force is generated. It is noted that other types of springs other than constant-force springs may be used. Although not shown, there may be a peg in the center of constant force spring 204. A first end 206 of constant force spring 204 is engaged with first end 218*a* of axel 116. For example, first end 206 of constant force spring 204 may be screwed, riveted, welded, glued, or attached by any other means, to first end 218*a* of axel 116. Spring collar 208 is also connected to first end 218*a* of axel 216 within spring case 106. Spring collar 208 may be formed in two pieces and may be secured to first end 218*a* of axel 116 using screws, bolts, rivets, adhesive, or by any other means of attachment known now or in the future. First end 206 of constant force spring 204 extends through a slit (not shown) in spring collar 208. Spring collar 208 provides a surface around which constant force spring 204 may coil. It should be noted that spring collar 208 is not essential to operation of running-end spool containment device 100. In an alternate embodiment, spring collar is not present and constant force spring 204 coils around and uncoils from around first end 218*a* of axel 116 directly.

Also shown in FIG. 2 is an axel nut 228 disposed on second end 218*b* of axel 116. Axel nut 228 may extend into lock case 108 instead of, or in addition to, second end 218*b* of axel 116.

Figure 3:
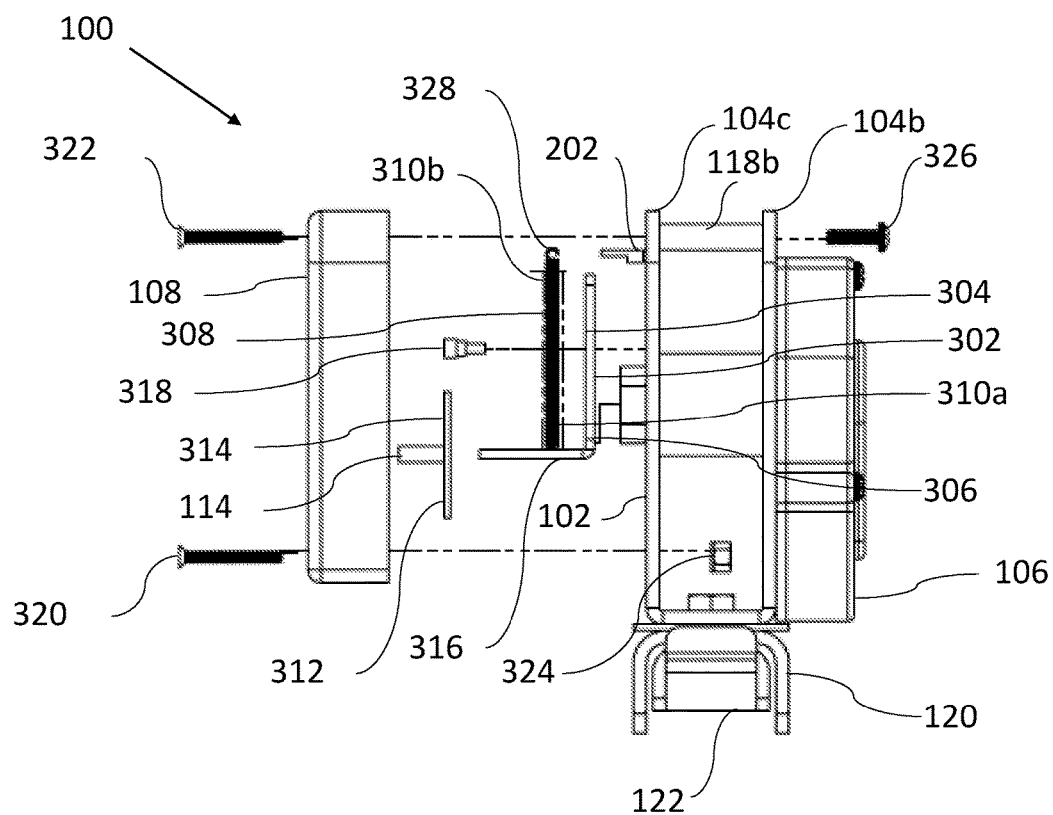
FIG. 3 shows an exploded front view of the running-end spool containment device of FIG. 1.

FIG. 3 shows an exploded front view of running-end spool containment device 100 of FIG. 1. As shown in FIG. 3, lock case 108 is connected to second spool bracket arm 104*c*. Lock case 108 may be connected to second spool bracket arm 104*c* by a fifth screw 320 and a corresponding nut 324. Lock case 108 may also be connected to second spool bracket arm 104*c* by a sixth screw (not shown) disposed opposite fifth screw 320 and a corresponding nut (not shown). Lock case 108 may further be connected to first strap guide 118*a* and second strap guide 118*b*, respectively, through second spool bracket arm 104*c* by a seventh screw 322 and an eighth screw (not shown) disposed opposite seventh screw 322. In the present embodiment, screws are used to connect lock case 108 to second spool bracket arm 104*c* and lock case 108 to first and second strap guides 118*a* and 118*b*. However, persons skilled in the relevant art(s) will readily appreciate that any number of connecting mechanisms may be used to join lock case 108 to second spool bracket arm 104*c* and lock case 108 to first and second strap guides 118*a* and 118*b* including but not limited to adhesive attachment, soldering, or a combination thereof. Moreover, as a non-limiting example, first and second strap guides 118*a* and 118*b* may not be connected to lock case 108 at all and may instead be connected to first and second spool bracket arms 104*b* and 104*c*, such as by a screw 326, for example. Lock case 108 is a mechanism for holding axel 116 in place and holding a first strap 1002 shown in FIG. 10 at a certain length. Disposed between lock case 108 and second spool bracket arm 104*c* are a user-manipulable locking plate 302, a spring 308, and a lock tab 312. User-manipulable locking plate 302 has a locking plate face 304 and a locking plate arm 316. Locking plate arm 316 extends from a first end 306 of locking plate face 304. User-manipulable locking plate 302 is movably attached to second spool bracket arm 104*c* as explained more fully with respect to FIG. 4.

As shown in FIG. 3, running-end spool containment device 100 further includes lock tab 312. Lock tab 312 includes a lock tab plate 314 and lock tab arm 114 extending from substantially a center of lock tab plate 314. Lock tab arm 114 is substantially perpendicular to lock tab plate 314. Lock tab arm 114 may extend through lock tab aperture 112 in an outer face 110 of lock case 108. Lock tab arm 114 is configured to be moved between a first position and a second position within lock tab aperture 112 in outer face 110 of lock case 108. Lock tab 312 moves with lock tab arm 114. Further, in some embodiments, lock tab arm 114 may be a hollow rigid bar into which locking plate arm 316 extends, such that user-manipulable locking plate 302 moves with lock tab 312. It should be noted however, that lock tab 312 is not essential to operation of running-end spool containment device 100 and that, in an alternate embodiment, lock tab 312 is not present and instead, locking plate arm 316 extends through lock tab aperture 112 in outer face 110 of lock case 108 and is configured to be moved between a first position and a second position within lock tab aperture 112 in outer face 110 of lock case 108.

Figure 4:
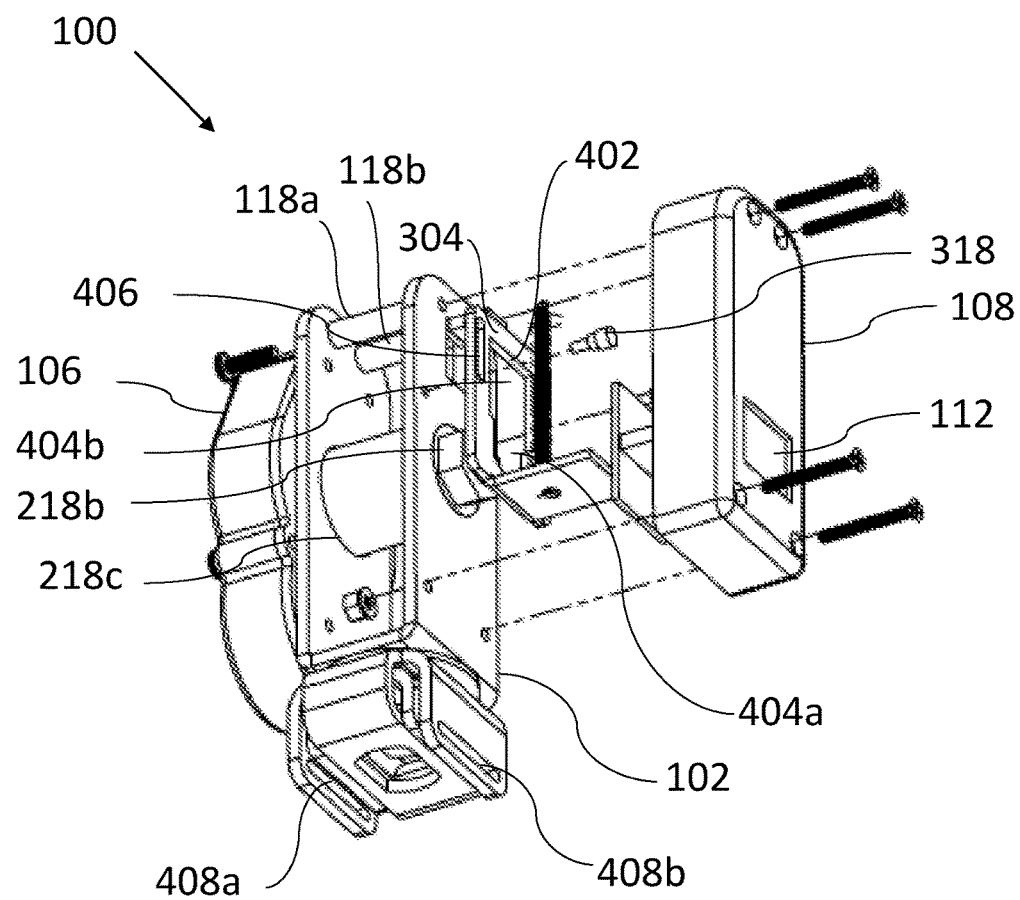
FIG. 4 shows an exploded front isometric view of the running-end spool containment device of FIG. 1.

FIG. 4 shows an exploded front isometric view of running-end spool containment device 100 of FIG. 1. As shown in FIG. 4, locking plate face 304 has a locking plate channel 402 defined therein and a first elongated screw channel 406 defined therein. Locking plate face 304 has a second elongated screw channel (not shown) defined therein opposite first screw channel 406. A first screw 318, shown in FIG. 3, and a second screw (not shown) moveably connect user-manipulable locking plate 302 to second spool bracket arm 104*c* via first elongated screw channel 406 and second elongated screw channel (not shown). First elongated screw channel 406 and second elongated screw channel (not shown) allow user-manipulable locking plate 302 to slide between a first position and a second position along second spool bracket arm 104*c*. Locking plate channel 402 has a narrow end 404*a* and a wide end 404*b*. Narrow end 404*a* of locking plate channel 402 is configured to engage with second end 218*b* of axel 116 to prevent axel 116 from rotating when locking plate arm 316 is in the second position within lock case aperture 112. Axel 116 is allowed to rotate freely when second end 218*b* of axel 116 is engaged with wide end 404*b* of locking plate channel 402 when lock tab arm 114 and, by extension, locking plate arm 316 are held in the first position within lock case aperture 112. For example, with cardinality as shown in FIG. 4, when a user pushes lock tab arm 114 in a downward direction (toward accessory bracket 120), user-manipulable locking plate 302 also moves in the downward direction such that narrow end 404*a* of locking plate channel 402 moves down away from second end 218*b* of axel 116 and wide end 404*b* of locking plate channel 402 surrounds second end 218*b* of axel 116, allowing axel 116 to rotate freely. When lock tab arm 114 is released, lock tab arm 114 moves in an upward direction (away from accessory bracket 120) causing locking plate channel 402 to move in the upward direction further causing narrow end 404*a* of locking plate channel 402 to engage with second end 218*b* of axel 116, preventing axel 116 from rotating.

FIG. 4 also shows a first accessory strap slot 408*a* and a second accessory strap slot 408*b*, which are described below with respect to FIG. 10.

Returning now to the description of FIG. 3, spring 308 has a first end 310*a* attached to locking plate arm 316 within lock case 108 and a second end 310*b* connected to flange 202 extending from second bracket arm 104*c*. For example, first end 310*a* of spring 308 may have a hook (not shown) formed thereon, which may hook onto an opening (not shown) in locking plate arm 316 and second end 310*b* of spring 308 may have a hook 328 formed thereon, which may hook onto an opening (not shown) in flange 202. Persons skilled in the relevant art(s) will readily appreciate that other methods of joining first end 310a of spring 308 to locking plate arm 316 and second end 310b of spring 308 to flange 202 may be used.

Figure 6:
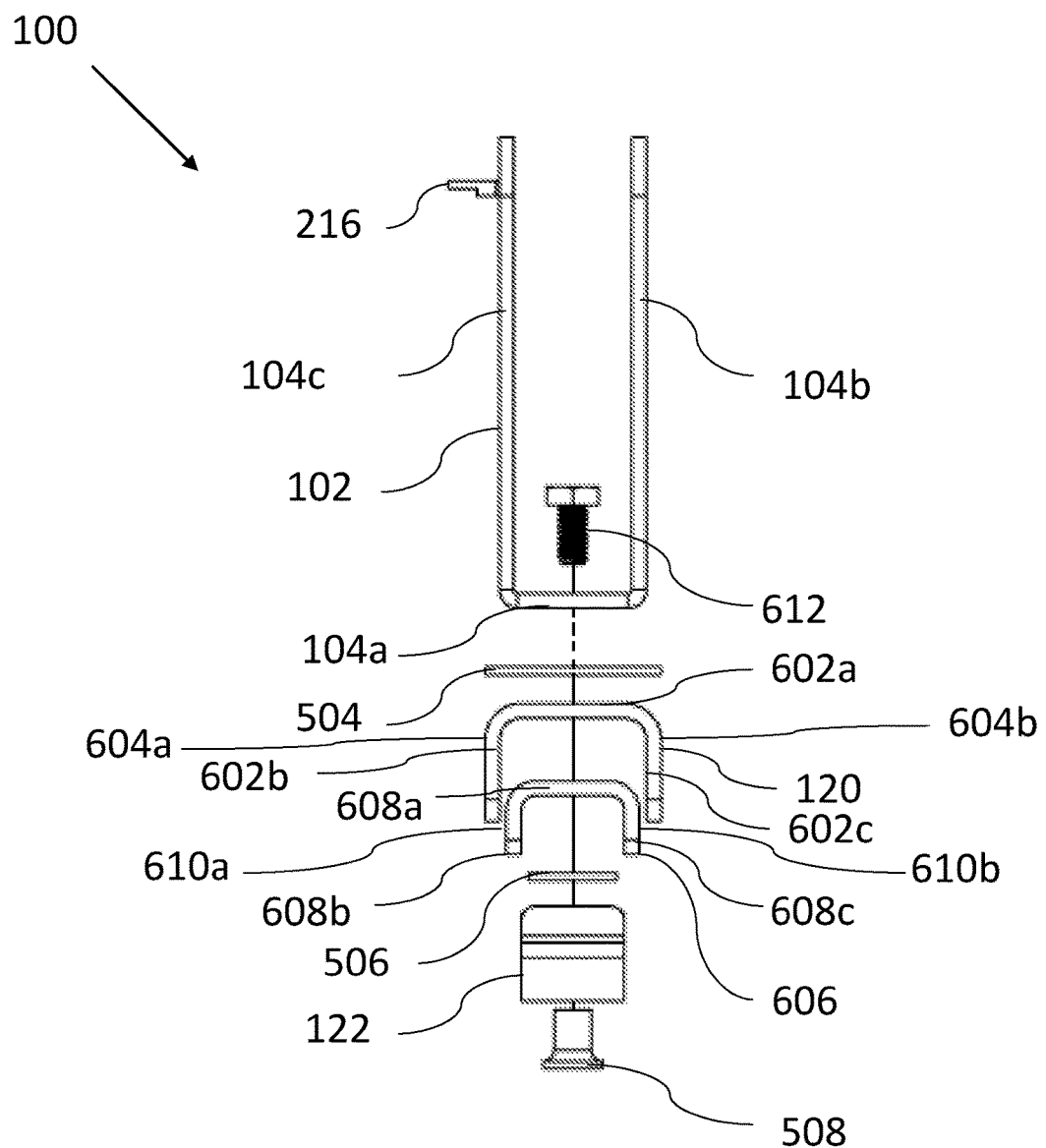
FIG. 6 shows an exploded front view of a portion of the running-end spool containment device of FIG. 1.

Accessory mounting features of running-end spool containment device 100 will now be described with respect to FIGS. 5 and 6. FIG. 5 shows an exploded side view of a portion of running-end spool containment device 100 of FIG. 1. FIG. 6 shows an exploded front view of a portion of running-end spool containment device 100 of FIG. 1. As shown in FIG. 5, running-end spool containment device 100 further includes an accessory plate 504, a washer 506, and a cap 508. As shown in FIG. 6, running-end spool containment device 100 further includes an accessory guide 606 and an accessory pin 612. Accessory bracket 120 is configured to accept a removable accessory (not shown). A removable accessory such as hand holds or foot holds, as non-limiting examples, may be attached to accessory bracket 120 by a second strap 1004 shown in FIG. 10. As shown in FIG. 6, accessory bracket 120 comprises an accessory bracket base 602a, a first accessory bracket arm 602b that extends from a first side 604a of accessory bracket base 602a, and a second accessory bracket arm 602c that extends from a second side 604b of accessory bracket base 602a and is substantially parallel to first accessory bracket arm 602b. Accessory guide 606 is disposed between first accessory bracket arm 602b and second accessory bracket arm 602c. Accessory guide has a smaller framework than accessory bracket 120 and allows accessory bracket to be slid onto accessory tab 122 at a correct attitude.

Accessory guide 606 comprises an accessory guide base 608a, a first accessory guide arm 608b that extends from a first side 610a of accessory guide base 608a and a second accessory guide arm 608c that extends from a second side 610b of accessory guide base 608a and is substantially parallel to first accessory guide arm 608b. It should be noted that accessory guide 606 is not essential to operation of running-end spool containment device 100. In an alternate, non-limiting embodiment, accessory guide 606 is not present and accessory bracket 120 attaches to accessory tab 122 directly.

Accessory tab 122 is disposed between first accessory guide arm 608b and second accessory guide arm 608c. Accessory tab 122 comprises an accessory tab base 502a, a first accessory tab arm 502b that extends from a first side 512a of accessory tab base 502a, a second accessory tab arm 502c that extends from a second side 512b of accessory tab base 502a and is substantially parallel to first accessory tab arm 502b, and an accessory tab top 502d that extends from a first end 514 of second accessory tab arm 502c and is substantially parallel to accessory tab base 504a. First accessory tab arm 502b has a height that is greater than a height of second accessory tab arm 502c and accessory tab top 502d forming a ledge 516.

Accessory tab 122 is configured to accept accessory bracket 120. First accessory tab arm 502b holds accessory bracket 120 in place and first accessory tab arm 502b is configured to bend when ledge 516 is pressed by a user to allow accessory bracket 120 to slide off of accessory guide 606 and be removed. In this embodiment, accessory bracket 120 and accessory tab 122 are independently swiveable about accessory pin 612. Accessory plate 504 is disposed between spool bracket base 104a and accessory bracket 120 allowing accessory bracket 120 to swivel. Washer 506 is disposed between accessory tab top 502d and accessory guide base 608a allowing accessory tab 122 to swivel. Persons skilled in the relevant art(s) will readily appreciate that it is not necessary for operation of running-end spool containment device 100 for accessory bracket 120 and accessory tab 122 to swivel. Accessory pin 612 extends through a corresponding accessory pin channel 126 in each of accessory plate 504, accessory bracket base 602a, accessory guide base 608a, washer 506, accessory tab top 502d and into cap 508. Accessory pin channel 126 is wide enough to allow accessory bracket 120 and accessory tab 122 to swivel. Further, accessory pin channel 126 in accessory bracket base 602a extends from a central portion 512 of accessory bracket base 602a all the remaining way through accessory bracket base 602a so that accessory bracket 120 can be slid from between accessory plate 504 and accessory guide base 608a to be removed.

B. Components and Configuration of a First Example Running-End Spool Containment System FIG. 10 shows a front isometric view of a running-end spool containment system 1000 according to an embodiment. As shown in FIG. 10, running-end spool containment system 1000 includes running-end spool containment device 100 of FIG. 1, a first strap 1002 and a second strap 1004.

A first end 1006 of first strap 1002 is fed into spool bracket 102 (i.e., between first spool bracket arm 104b and second spool bracket arm 104c) between first strap guide 118a and second strap guide 118b, which help to keep first strap 1002 from twisting, and keep first end 1006 of first strap 1002 going in a fixed direction toward or away from central portion of axel 118c at a correct attitude. It should be noted that first strap guide 118a and second strap guide 118b are not essential to operation of running-end spool containment system 1000 or running-end spool containment device 100. In an alternate, non-limiting embodiment, first strap guide 118a and second strap guide 118b are not present and first end 1006 of first strap 1002 is fed directly into spool bracket 102. First end 1006 of first strap 1002 may be attached to central portion 218c of axel 116. As non-limiting examples, first end 1006 of first strap 1002 may be connected to central portion 218c of axel 116 by adhesive, by a rivet, or by a screw, etc. Alternately, first end 1006 of first strap 1002 may be fed into a slit (not shown) formed in central portion 218c of axel 116. In alternate embodiments first end 1006 of first strap 1002 may be sewn in a loop around central portion 218c of axel 116 or not attached at all and then wrapped around central portion 218c of axel 116 a number of times such that first end 1006 of first strap 1002 is pinned against itself and compression due to the wrapping keeps first end 1006 of strap 1002 in place. In such a case, first strap 1002 may include a marking indicating a point at which first strap 1002 should not be lengthened further to avoid disengagement of first end 1006 of first strap 1002 from central portion 218c of axel 116.

Second strap 1004 is for an accessory (not shown) such as a handle, as a non-limiting example. Second strap 1004 extends through first accessory strap slot 408a and second accessory strap slot 408b of accessory bracket 120. Second strap 1004 may be in the form of a loop, as shown in FIG. 10, however, second strap 1004 is not limited to being in the form of a loop. As a non-limiting example, accessory strap may have two ends to which are attached two accessories such as two hand grips. Alternately, as a non-limiting example, accessory strap may have two ends which are attached together by a carabiner or using some other form of attachment.

C. Operation of First Example Running-End Spool Containment System

Operation of first example running-end spool containment system 1000 and first example running-end spool containment device 100 will now be described with continued respect to FIGS. 1-6 and 10. First example running-end spool containment system 1000 and first example running-end spool containment device 100 have two modes of operation, an unlocked mode and a locked mode. First, an unlocked mode will be described, and then a locked mode will be described. Finally, transitioning between the locked mode and the unlocked mode will be described.

1. Unlocked Mode

A configuration and operation of first example running-end spool containment system 1000 and first example running-end spool containment device 100 in an unlocked mode will now be described.

Lock tab arm 114 and, by extension, locking plate arm 316 are held in the first position to place running-end spool containment system 1000 and first example running-end spool containment device 100 in an unlocked mode. In the unlocked mode, axel 116 is engaged with wide end 404b of locking plate channel 402 thereby enabling axel 116 to rotate freely. When axel 116 is enabled to rotate freely, constant force spring 204 is enabled to spool around and unspool from around spring collar 208. Spooling and unspooling of constant force spring 204 around itself causes first strap 1002 to spool around and unspool, respectively, from around central portion 218c of axel 116, thereby decreasing and increasing, respectively, a running-end length of first strap 1002.

In the unlocked mode, axel 116 rotates based on a condition of constant force spring 204. When running-end spool containment system 1000 and running-end spool containment device 100 are in the unlocked mode and constant force spring 204 is at rest, constant force spring 204 is coiled around itself within spring case 106. When axel 116 and spring collar 208 are rotated in a first direction, constant force spring 204 uncoils from around itself and coils around spring collar 208. At the same time, first strap 1002, which is attached to central portion 218c of axel 116, uncoils from around central portion 218c of axel 116, thereby increasing a length of first strap 1002. Uncoiling of constant force spring 204 from itself places constant force spring 204 under tension, and constant force spring 204 will naturally tend to uncoil from spring collar 208 and coil back around itself. When constant force spring 204 uncoils from spring collar 208 and coils back around itself, axel 116 rotates in a second direction coiling first strap 1002 around axel 116, thereby decreasing a length of first strap 1002.

2. Locked Mode

In a locked mode, first end 218a of axel 116 is engaged with narrow end 404a of locking plate channel 402 thereby locking axel 116. For example, narrow end 404a of locking plate channel 402 may have similar dimensions to axel nut 228, which is attached to second end 218b of axel 116, and when lock tab arm 114, and by extension, locking plate arm 316 are in the second position, user-manipulable locking plate is positioned such that axel nut 228 is fitted snugly within narrow end 404a of locking plate channel 402 thereby preventing axel 116 from rotating. Although in this embodiment axel nut 228 and narrow end 404a of locking plate channel 402 having similar dimensions to axel nut 228 are used, persons skilled in the relevant art(s) will appreciate that other shapes of axel ends and channels may be used. Furthermore, in an alternate embodiment, axel nut 228 is not present, and first end 218a of axel 116 engages directly with narrow end of channel 404a of locking plate channel 402 thereby locking axel 116, constant force spring 308, and first strap 1002 in place in a same manner as described above with respect to axel nut 228. In the locked mode, when axel 116 is prevented from rotating, constant force spring 308 and first strap 1002, which both wind around and unwind from around portions of axel 116, are also locked in place. Therefore, first strap 1002 can be locked at any length.

3. Transitioning Between Locked Mode and Unlocked Mode

Axel 116 is locked or unlocked based on a condition of spring 308 and lock tab arm 114 and, by extension, locking plate arm 316 and user-manipulable locking plate 302. Spring 308 is configured to be stretched when lock tab arm 114 and, by extension, locking plate arm 316 are held in the first position within lock case aperture 112 and to pull user-manipulable locking plate 302 toward flange 202 when lock tab arm 114, and by extension, locking plate arm 316 are released and move to the second position. Wide end 404b of locking plate channel 402 is configured to engage with second end 218b of axel 116 and/or axel nut 228 when lock tab arm 114, and by extension, locking plate arm 316 are held in the first position, thereby allowing axel 116 to rotate freely (unlocked mode). Narrow end 404a of locking plate channel 402 is configured to engage with second end 218b of axel 116 and/or axel nut 228 preventing axel 116 from rotating (locked mode) when lock tab arm 114, and by extension, locking plate arm 316 are released and move into the second position and user-manipulable locking plate 302 is pulled toward flange 202 by spring 308. In this embodiment, it is movement of locking plate channel 402 in user manipulable locking plate 304 that locks and unlocks axel 116. Locking plate channel is moved by virtue of manipulating lock tab arm 114 and, by extension, locking plate arm 316 between the first and second positions.

Figure 7:
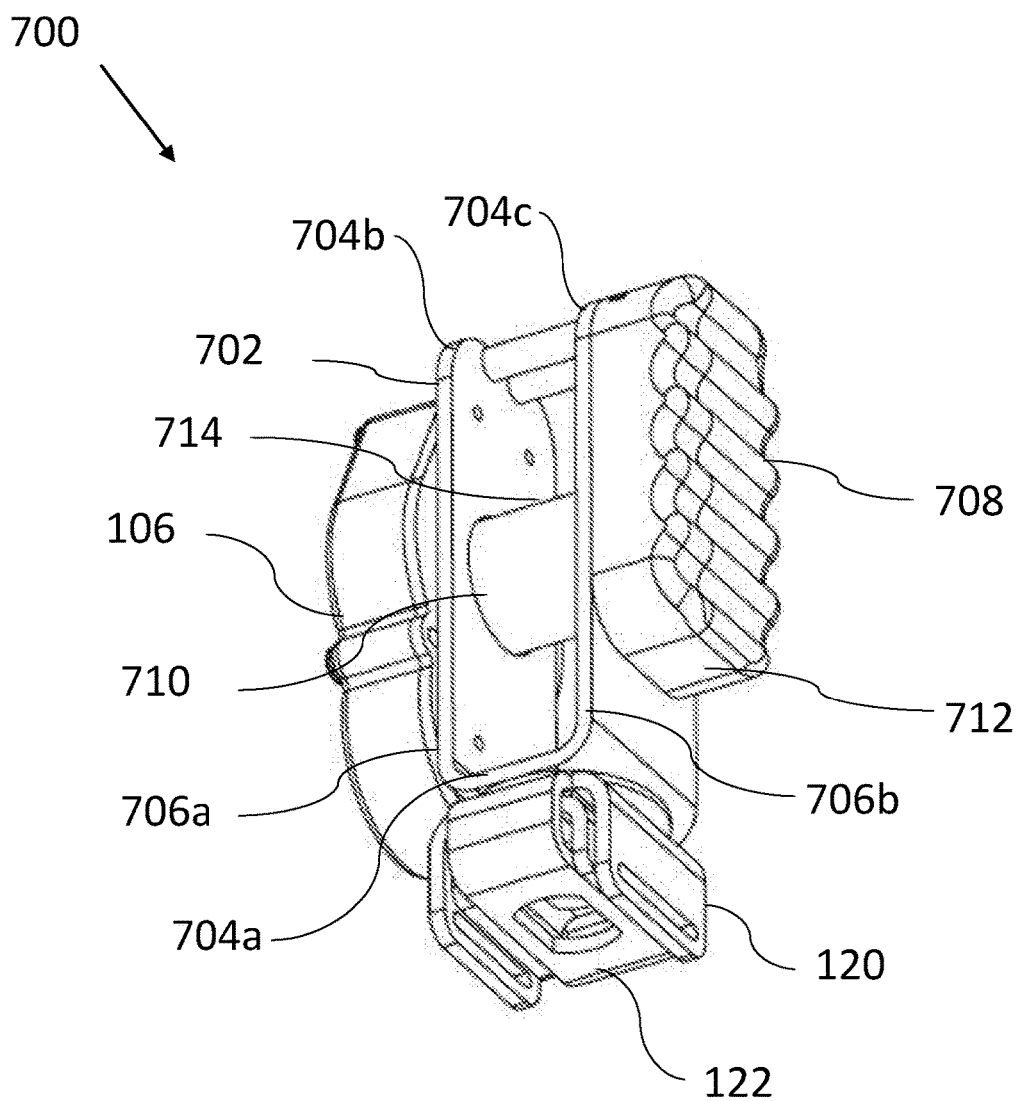
FIG. 7 shows a front isometric view of a running-end spool containment device in accordance with another embodiment.

D. Components and Configuration of a Second Example Running-End Spool Containment Device A second example running-end spool containment device will now be described with respect to FIGS. 7-9. FIG. 7 shows a front isometric view of a second example running-end spool containment device 700. Some elements of running-end spool containment device 700 are the same as those of running-end spool containment device 100 of FIGS. 1-6 and descriptions thereof are not included in this section for reasons of brevity. As shown in FIG. 7, second example running-end spool containment device 700 includes a spool bracket 702, spring case 106, a locking slider 708, an axel 710, accessory bracket 120 and accessory tab 122. Spring case 106, accessory bracket 120, and accessory tab 122 include the same elements and perform the same functions as in FIGS. 1-6 and 10 and the descriptions thereof are not included in this section for reasons of brevity. Spool bracket 702 comprises a spool bracket base 704a, a first spool bracket arm 704b that extends from a first side 706a of spool bracket base 704a, and a second spool bracket arm 704c that extends from a second side 706b of spool bracket base 704a and is substantially parallel to first spool bracket arm 704b. Locking slider 708 includes at least a base 712. Axel 710 includes a central portion 714 disposed between first spool bracket arm 704b and second spool bracket arm 704c.

Figure 8:
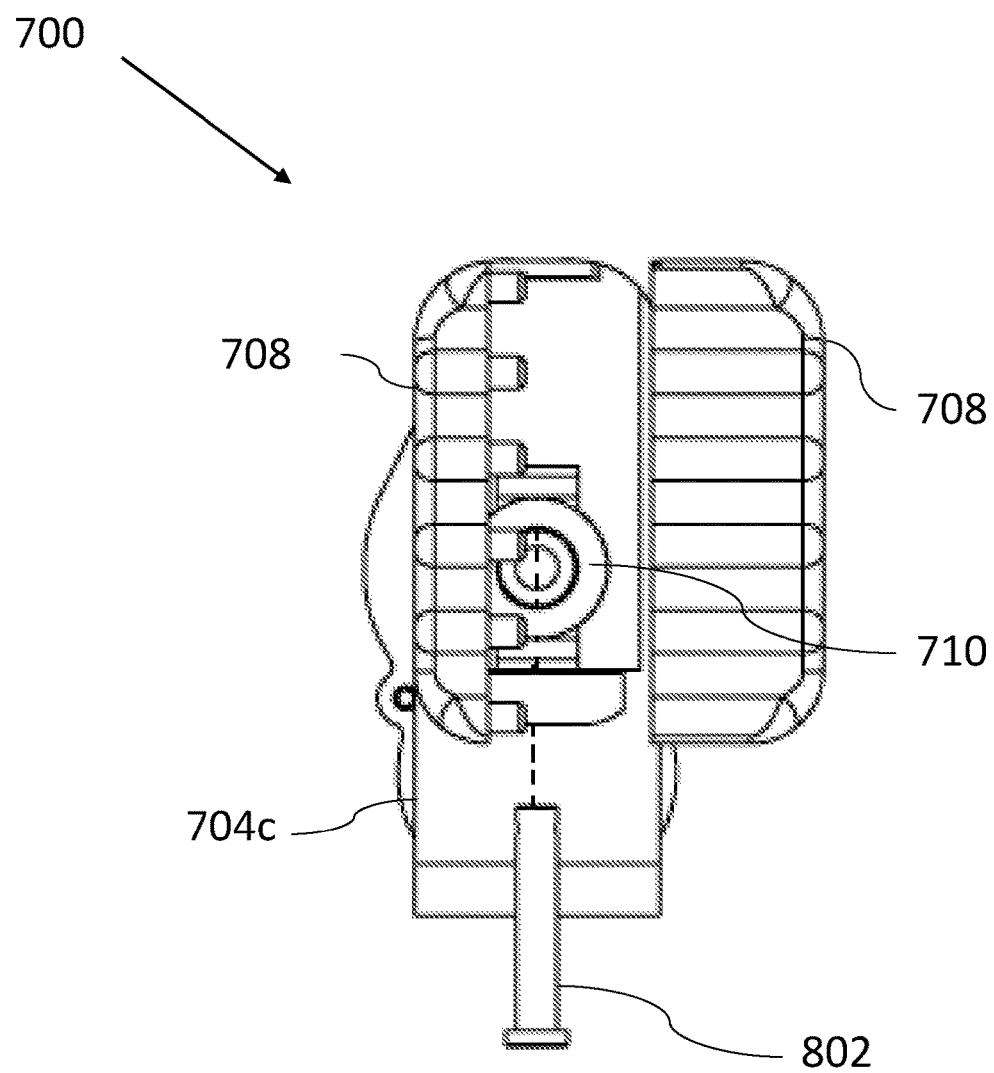
FIG. 8 shows an exploded side cut-away view of a portion of the running-end spool containment device of FIG. 7.

FIG. 8 shows an exploded side cut-away view of a portion of running-end spool containment device 700 of FIG. 7. As shown in FIG. 8, running-end spool containment device 700 further includes a locking pin 802.

Figure 9:
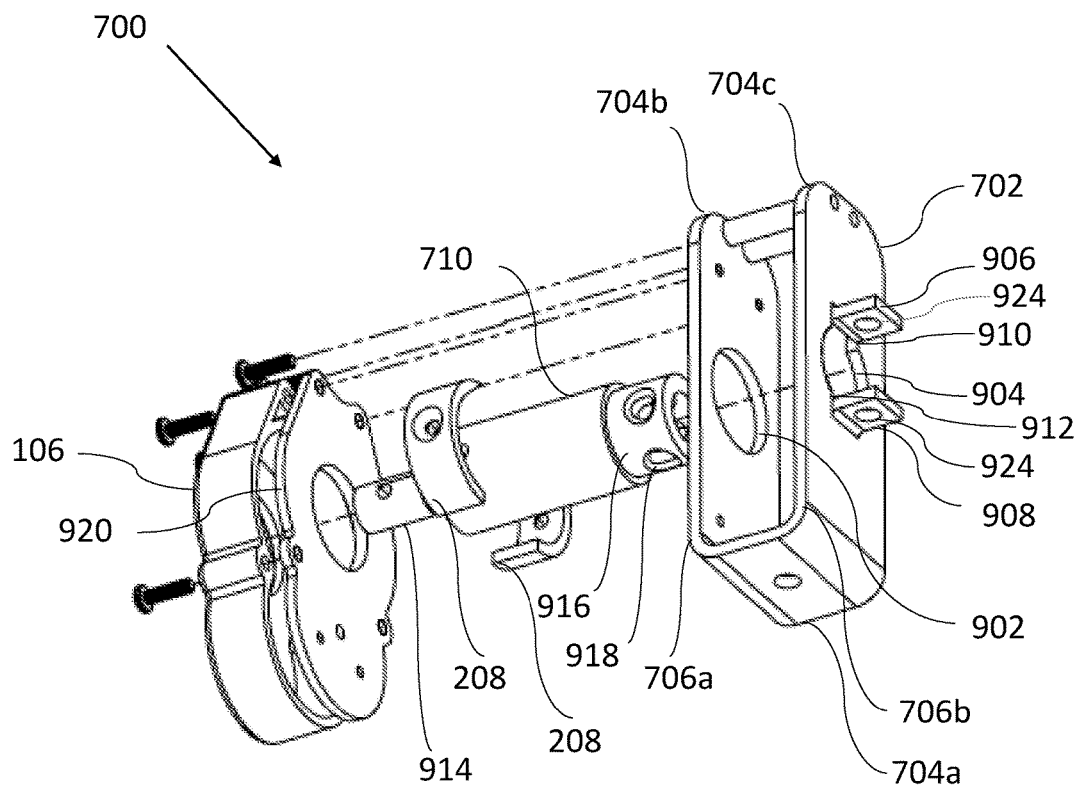
FIG. 9 shows an exploded front isometric view of a portion of the running-end spool containment device of FIG. 7.

FIG. 9 shows an exploded front isometric view of a portion of running-end spool containment device 700 of FIG. 7. As shown in FIG. 9, first spool bracket arm 704b has a first spool bracket aperture 902 defined therein and second spool bracket arm 704c has a second spool bracket aperture 904 defined therein. Second spool bracket arm further includes a first tab 906 at a first end 910 of second spool bracket aperture 904 and a second tab 908 at a second end 912 of second spool bracket aperture 904. First tab 906 has a first locking pin channel 922 defined therein and second tab 908 has a second locking pin channel 924 defined therein. Axel 710 has a first axel end 914 that extends through first spool bracket aperture 902 into spring case 106 and a second axel end 916 that extends through second spool bracket aperture 904 into locking slider 708. Second axel end 916 has a third locking pin channel 918 defined therein and a fourth locking pin channel (not shown) positioned opposite the third locking pin channel 918 defined therein.

Although not explicitly shown, locking pin 802 is connected by any suitable connecting means to an inside face (not shown) of base 712 of locking slider 708. When locking slider 708 is disposed in a first position and running-end spool containment device 700 is in a locked mode, locking pin 802 extends through second locking pin channel 924 third locking pin channel 918, first locking pin channel 922, and fourth locking pin channel (not shown) locking axel 710 in place, which causes the constant force spring (not shown) in spring case 106 and a first strap (not shown) to be locked in place.

When locking slider 708 is moved to and held in a second position and running-end spool containment device 700 is in an unlocked mode, locking pin 802 slides out of fourth locking pin channel (not shown), first locking pin channel 922, third locking pin channel 918, and first locking pin channel 924, freeing axel 710 to rotate freely, allowing the constant force spring (not shown) to spool around and unspool from around first end of axel 914 and the first strap (not shown) to spool around and unspool from around central portion 714 of axel 710, thereby allowing a length of the strap to be selectively increased and decreased.

Figure 10:
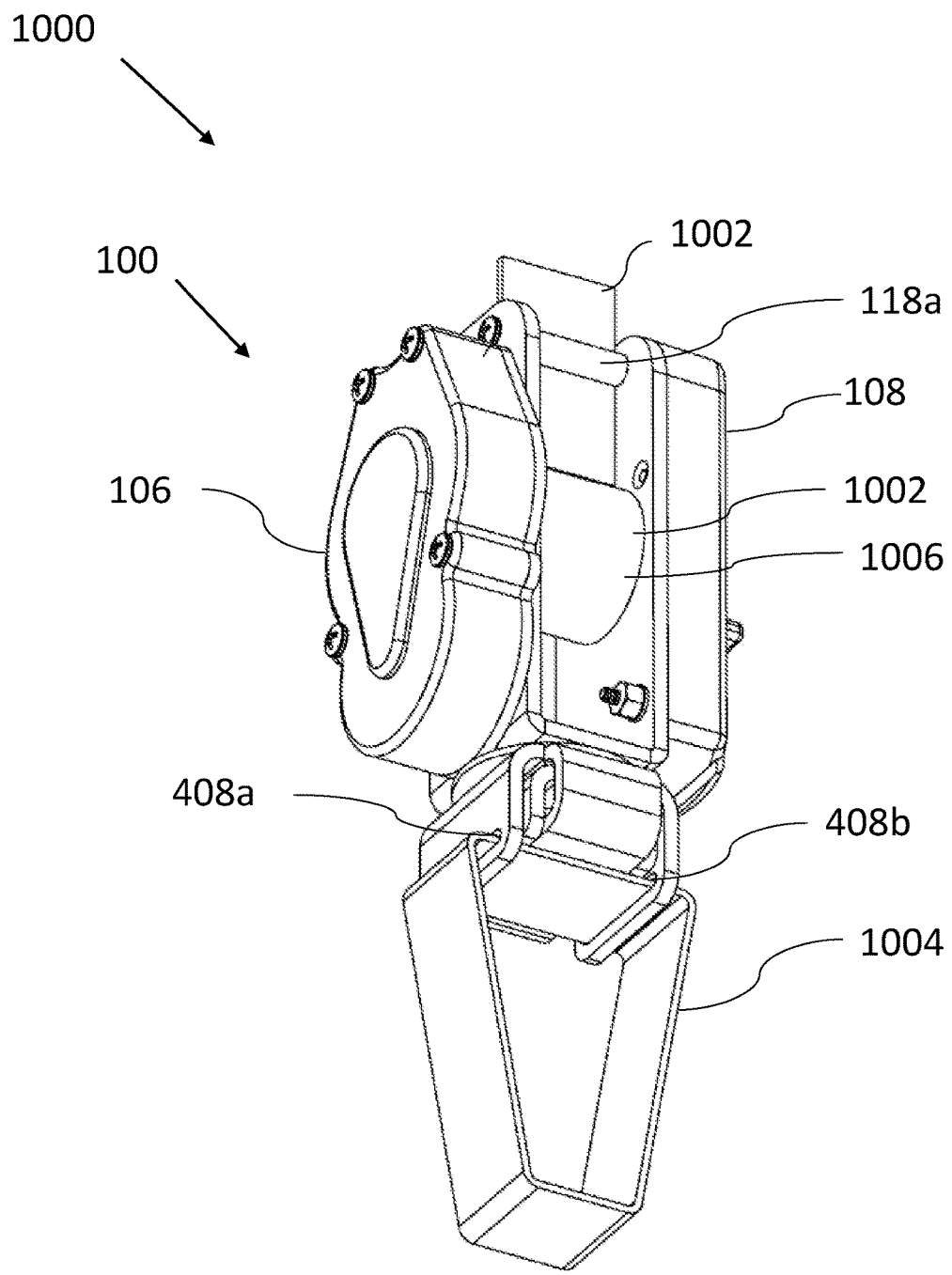
FIG. 10 shows a front isometric view of a running-end spool containment system in accordance with an embodiment.

Although not shown, a second example running-end spool containment system may include running-end spool containment device 700 and first and second straps 1002 and 1004 similar to those shown in FIG. 10.

E. Third Example Running-End Spool Containment System

A third example running-end spool containment system and device are disclosed in U.S. Provisional Patent Application No. 62/375,242 filed on Aug. 15, 2016 and entitled RUNNING-END SPOOL CONTAINMENT, which is incorporated by reference herein in its entirety.

F. Materials

All components of first example running-end spool containment device 100, first example running-end spool containment system 1000 and second example running-end spool containment device 700 may be formed of a metal, a plastic, a polymer, or a combination thereof. In a non-limiting embodiment, spring case 106, lock case 108, and lock case 708 may be formed of a metal, plastic, or polymer. Constant force spring 204 may be formed of a thin metal coil. In a non-limiting embodiment, lock tab 312 may be formed of a metal, plastic or polymer; locking plate 302 may be formed of a metal or a robust plastic or nylon; and spring 308 may be formed of a metal or polymer. Base plate 212 may be formed of metal and may be contoured in a same shape as spring case 1006. First and second strap guides 118a and 118b may be formed of any metal, plastic, or hard rubber. A coefficient of friction of a material of first and second strap guides 118a and 118b may be higher if constant force spring 204 is strong enough and a space between first and second strap guides 118a and 118b is large enough. In a non-limiting embodiment, all accessory components with the exception of the accessory tab 122, i.e., accessory bracket 120, accessory guide 606, accessory plate 504, washer 506, accessory pin 612, and cap 508 may be formed of a metal such as steel or aluminum with a low enough coefficient of friction to allow accessory bracket 120 to slide from accessory guide 606 and to allow accessory bracket 120 and accessory tab 122 to swivel. Axel 116 and axel 710 may be formed of any metal or hard polymer, and may be solid or hollow.

All components of first example running-end spool containment device 100, first example running-end spool containment system 1000 and second example running-end spool containment device 700 may be 3D printed, carved using computer numerical control, injection molded, or machined. This list is not exhaustive, however, and persons skilled in the relevant art(s) will understand that other methods of manufacturing the components of first example running-end spool containment device 100, first example running-end spool containment system 1000 and second example running-end spool containment device 700 may be used.

G. Closing Remarks

First example running-end spool containment device 100, first example running-end spool containment system 1000 and second example running-end spool containment device 700 advantageously provide for the containment of the running-end(s) of a strap while providing a convenient way to increase and decrease a length of the strap. First example running-end spool containment device 100, first example running-end spool containment system 1000 and second example running-end spool containment device 700 further provide for an easy and convenient way to change accessories to tailor a strap to a specific use.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A running end spool containment device comprising:
a spool bracket having a spool bracket base, a first spool bracket arm that extends from a first side of the spool bracket base, and a second spool bracket arm that extends from a second side of the spool bracket base and is substantially parallel to the first spool bracket arm, the first spool bracket arm having a first spool bracket aperture defined therein, and the second spool bracket arm having a second spool bracket aperture defined therein;
a spring case attached to the first spool bracket arm;
a lock case attached to the second spool bracket arm, the lock case comprising an outer face having a lock case aperture defined therein;
an axel, the axel comprising a first end that extends through the first spool bracket aperture into the spring case, a second end that extends through the second spool bracket aperture into the lock case, and a central portion that is disposed between the first and the second spool bracket arms;
a constant force spring disposed within the spring case, the constant force spring having a first end connected to the first end of the axel;

a user-manipulable locking plate disposed within the lock case, the user-manipulable locking plate comprising a locking plate face and a locking plate arm that extends from a first end of the locking plate face and through the lock case aperture, the locking plate arm being configured to be moved between a first position and a second position within the lock case aperture, the locking plate face moving with the locking plate arm, the locking plate face having a locking plate channel formed therein that is configured to engage with the axel to prevent the axel from rotating when the locking plate arm is moved to the second position, the locking plate channel being configured not to engage with the axel to enable the axel to rotate freely when the locking plate arm is moved to the first position;

the constant force spring being configured to wind around the first end of the axel when the axel rotates in a first direction, the constant force spring placing the axel under tension when wound around the first end of the axel causing the axel to rotate in a second direction opposite the first direction when no other force is applied to the axel, the constant force spring being further configured to unwind from around the first end of the axel when the axel rotates in the second direction; and an accessory bracket removably mounted to the spool bracket base, the accessory bracket configured to allow a user to engage an accessory with the spool bracket base and to disengage the accessory from the spool bracket base; and the device configured to accept a strap that has a first running end that extends between the first spool bracket arm and the second spool bracket arm, the first running end being connected to the central portion of the axel, the first running end winding around the axel when the axel rotates in the first direction and unwinding from around the axel when the axel rotates in the second direction.

2. The device of claim 1, wherein the user-manipulable locking plate is movably connected to the second spool bracket arm, and wherein the locking plate channel has a narrow end and a wide end, the narrow end of the locking plate channel being configured to engage with the axel to prevent the axel from rotating when the locking plate arm is moved to the second position within the lock case aperture.

3. The device of claim 2, further comprising a spring, the spring comprising a first end attached to the locking plate arm within the lock case and a second end connected to a flange extending from the second spool bracket arm, the spring being configured to be stretched when the locking plate arm is held in the first position within the lock case aperture and to pull the user-manipulable locking plate toward the flange when the locking plate arm is released, the axel being configured to disengage from the narrow end of the locking plate channel allowing the axel to rotate freely within the wide end of the locking plate channel when the locking plate arm is held in the first position.

4. The device of claim 1, further comprising:
a first strap guide, the first strap guide being disposed between the first spool bracket arm and the second spool bracket arm; and
a second strap guide, the second strap guide being disposed between the first spool bracket arm and the second spool bracket arm,
the first strap guide and the second strap guide being configured to guide the first running end of the strap toward the axel.

5. The device of claim 1, further comprising an accessory plate, the accessory plate being disposed between the spool bracket base and the accessory bracket, the accessory plate being configured to allow the accessory bracket to swivel.

6. The device of claim 1, further comprising a spring collar, the spring collar surrounding the first end of the axel, the spring collar comprising a slit defined therein into which is fed the first end of the constant force spring, the constant force spring being configured to wind around the spring collar when the axel rotates in the first direction and being configured to unwind from around the spring collar when the axel rotates in the second direction.

7. The device of claim 1, wherein the accessory bracket comprises an accessory bracket base, a first accessory bracket arm that extends from a first side of the accessory bracket base, and a second accessory bracket arm that extends from a second side of the accessory bracket base and is substantially parallel to the first accessory bracket arm, the device further comprising an accessory tab, the accessory tab being disposed between the first accessory bracket arm and the second accessory bracket arm, the accessory tab comprising an accessory tab base, a first accessory tab arm that extends from a first side of the accessory tab base, a second accessory tab arm that extends from a second side of the accessory tab base, and an accessory tab top that extends from a first end of the second accessory tab arm, the accessory bracket being removably disposed on the accessory tab top, the first accessory tab arm having a height that is higher than the second accessory tab arm and the accessory tab top, the first accessory tab arm being configured to hold the accessory bracket in place, the first accessory tab arm being further configured to bend down to allow the accessory bracket to slide off the accessory tab top to be removed.

8. A running end spool containment system comprising:
a device comprising:
a spool bracket having a spool bracket base, a first spool bracket arm that extends from a first side of the spool bracket base, and a second spool bracket arm that extends from a second side of the spool bracket base and is substantially parallel to the first spool bracket arm, the first spool bracket arm having a first spool bracket aperture defined therein, and the second spool bracket arm having a second spool bracket aperture defined therein;
a spring case attached to the first spool bracket arm;
a lock case attached to the second spool bracket arm, the lock case comprising an outer face having a lock case aperture defined therein;
an axel, the axel comprising a first end that extends through the first spool bracket aperture into the spring case, a second end that extends through the second spool bracket aperture into the lock case, and a central portion that is disposed between the first and second spool bracket arms;
a constant force spring disposed within the spring case, the constant force spring having a first end connected to the first end of the axel;
a user-manipulable locking plate disposed within the lock case, the user-manipulable locking plate comprising a locking plate face and a locking plate arm that extends from a first end of the locking plate face and through the lock case aperture, the locking plate arm being configured to be moved between a first position and a second position within the lock case aperture, the locking plate face moving with the locking plate arm, the locking plate face having a locking plate channel formed therein that is configured to engage with the axel to prevent the axel from rotating when the locking plate arm is moved to the second position, the locking plate channel being configured not to engage with the axel to enable the axel to rotate freely when the locking plate arm is moved to the first position;

the constant force spring being configured to wind around the first end of the axel when the axel rotates in a first direction, the constant force spring placing the axel under tension when wound around the first end of the axel causing the axel to rotate in a second direction opposite the first direction when no other force is applied to the axel, the constant force spring being further configured to unwind from around the first end of the axel when the axel rotates in the second direction; and an accessory bracket removably mounted to the spool bracket base, the accessory bracket configured to allow a user to engage an accessory with the spool bracket base and to disengage the accessory from the spool bracket base; and a strap that has a first running end that extends between the first spool bracket arm and the second spool bracket arm, the first running end being connected to the central portion of the axel, the first running end winding around the axel when the axel rotates in the first direction and unwinding from around the axel when the axel rotates in the second direction.

9. The system of claim 8, wherein the user-manipulable locking plate is movably connected to the second spool bracket arm and wherein the locking plate channel has a narrow end and a wide end, the narrow end of the locking plate channel configured to engage with the axel to prevent the axel from rotating when the locking plate arm is moved to the second position within the lock case aperture.

10. The system of claim 9, further comprising a spring, the spring comprising a first end attached to the locking plate arm within the lock case and a second end connected to a flange extending from the second spool bracket arm, the spring configured to be stretched when the locking plate arm is held in the first position within the lock case aperture and to pull the user-manipulable locking plate toward the flange when the locking plate arm is released, the axel disengaging from the narrow end of the locking plate channel allowing the axel to rotate freely within the wide end of the locking plate channel when the locking plate arm is held in the first position.

11. The system of claim 8, further comprising:
a first strap guide, the first strap guide being disposed between the first spool bracket arm and the second spool bracket arm; and
a second strap guide, the second strap guide being disposed between the first spool bracket arm and the second spool bracket arm,
the first strap guide and the second strap guide being configured to guide the first running end of the strap toward the axel.

12. The system of claim 8, further comprising an accessory plate, the accessory plate being disposed between the spool bracket base and the accessory bracket, the accessory plate being configured to allow the accessory bracket to swivel.

13. The system of claim 8, further comprising a spring collar, the spring collar surrounding the first end of the axel, the spring collar comprising a slit defined therein into which is fed the first end of the constant force spring, the constant force spring being configured to wind around the spring collar when the axel rotates in the first direction and being configured to unwind from around the spring collar when the axel rotates in the second direction.

14. The system of claim 8, wherein the accessory bracket comprises an accessory bracket base, a first accessory bracket arm that extends from a first side of the accessory bracket base, and a second accessory bracket arm that extends from a second side of the accessory bracket base and is substantially parallel to the first accessory bracket arm, the device further comprising an accessory tab, the accessory tab being disposed between the first accessory bracket arm and the second accessory bracket arm, the accessory tab comprising an accessory tab base, a first accessory tab arm that extends from a first side of the accessory tab base, a second accessory tab arm that extends from a second side of the accessory tab base, and an accessory tab top that extends from a first end of the second accessory tab arm, the accessory bracket being removably disposed on the accessory tab top, the first accessory tab arm having a height that is higher than the second accessory tab arm and the accessory tab top, the first accessory tab arm being configured to hold the accessory bracket in place, the first accessory tab arm being further configured to bend down to allow the accessory bracket to slide off the accessory tab top to be removed.

\* \* \* \* \*